United States Patent
Girardeau, Jr. et al.

(10) Patent No.: US 8,457,264 B2
(45) Date of Patent: Jun. 4, 2013

(54) RADIO RECEIVER HAVING A DIVERSITY ANTENNA STRUCTURE

(75) Inventors: James Ward Girardeau, Jr., Austin, TX (US); Paul Morris Astrachan, Austin, TX (US); Mathew A. Rybicki, Austin, TX (US); Bojan Subasic, Etobicoke (CA)

(73) Assignee: VIXS Systems, Inc., Toronto, Ontario (CA)

( * ) Notice: Subject to any disclaimer, the term of this patent is extended or adjusted under 35 U.S.C. 154(b) by 1693 days.

(21) Appl. No.: 10/944,509

(22) Filed: Sep. 17, 2004

(65) Prior Publication Data

US 2005/0032497 A1   Feb. 10, 2005

Related U.S. Application Data

(63) Continuation-in-part of application No. 10/376,486, filed on Feb. 28, 2003.

(51) Int. Cl.
*H04B 1/10* (2006.01)

(52) U.S. Cl.
USPC ........... 375/349; 375/260; 375/267; 375/340; 375/346; 375/347; 375/348; 375/350; 375/351; 455/132; 455/272; 455/303; 455/562.1; 455/575.7

(58) Field of Classification Search
USPC .............. 455/272, 575.7, 132–135, 137, 273, 455/277.1; 375/347, 316, 206, 267, 349, 375/340, 351; 370/334
See application file for complete search history.

(56) References Cited

U.S. PATENT DOCUMENTS

| | | | | |
|---|---|---|---|---|
| 5,787,131 | A * | 7/1998 | Bottomley | 375/347 |
| 5,999,826 | A * | 12/1999 | Whinnett | 455/561 |
| 6,334,051 | B1 * | 12/2001 | Tsurumi et al. | 455/324 |
| 6,421,543 | B1 * | 7/2002 | Molnar | 455/562.1 |
| 6,545,643 | B1 * | 4/2003 | Sward et al. | 343/702 |
| 6,622,013 | B1 * | 9/2003 | Miyoshi et al. | 455/277.2 |
| 6,973,296 | B2 * | 12/2005 | Webster et al. | 455/296 |
| 7,039,356 | B2 * | 5/2006 | Nguyen | 455/13.3 |
| 7,366,089 | B2 * | 4/2008 | Tehrani et al. | 370/208 |
| 7,649,833 | B2 * | 1/2010 | Sadri et al. | 370/208 |
| 2003/0002471 | A1 * | 1/2003 | Crawford et al. | 370/343 |
| 2004/0008614 | A1 * | 1/2004 | Matsuoka et al. | 370/203 |

* cited by examiner

*Primary Examiner* — Sophia Vlahos
(74) *Attorney, Agent, or Firm* — Garlick & Markison; Timothy W. Markison; Jessica W. Smith

(57) ABSTRACT

A radio receiver includes a first diversity antenna structure, a second diversity antenna structure, a first RF receiver section, a second RF receiver section, a combining module, and a baseband processing module. The first diversity antenna structure provides the received inbound RF signals from one of the plurality of first antennas based on a first antenna selection signal to produce first received inbound RF signals. The second diversity antenna structure provides the received inbound RF signals from one of the plurality of second antennas based on a second antenna selection signal to produce second received inbound RF signals. The first and second RF receiver sections are operably coupled to convert the first and second received inbound RF signals into first and second inbound baseband signals, respectively. The combining module combines the first and second inbound baseband signals to produce inbound baseband signals.

18 Claims, 4 Drawing Sheets radio receiver 10 radio receiver 50 radio receiver 70 diversity antenna structure 72 diversity antenna structure 72

RADIO RECEIVER HAVING A DIVERSITY ANTENNA STRUCTURE

This patent application is claiming priority under 35 USC §120 as a continuation in part to co-pending patent application entitled METHOD AND APPARATUS FOR SIGNAL DECODING IN A DIVERSITY RECEPTION SYSTEM WITH MAXIMUM RATIO COMBINING, a Ser. No. of 10/376,486 and a filing date of Feb. 28, 2003.

BACKGROUND OF THE INVENTION

1. Technical Field of the Invention

This invention relates generally to wireless communication systems and more particularly to radio receivers used in such wireless communication systems.

2. Description of Related Art

Radio receivers are known to receive radio frequency (RF) signals and convert them to baseband, or near baseband, signals that are subsequently demodulated to recapture transmitted data. The accuracy in which the transmitted data is recaptured is dependent on the radio receiver's ability to distinguish the desired signals from undesired signals and noise. For example, in an IEEE 802.11a compliant radio receiver, the transmitted data may be transmitted on a particular channel, where other channels may interfere with the receiver's ability to process the signals on the desired channel. Further difficulties arise when the signal strength of the desired signals are weak, thus yielding a low signal to noise and/or interferer ratio.

As is known, the signal strength of the desired signals varies based on transmit power of the transmitter, distance between the receiver and the transmitter, and multi-path fading. As is also known, multi-path fading occurs when the receiver is in a physical location where the multiple wireless paths from the transmitter to the receiver substantially cancel one another, even though the signal strength of many of the paths may be relatively strong.

To combat the adverse effects of multi-path fading, many receivers include a diversity antenna, which includes two or more antennas spaced one-half wavelength or more apart. With such spacing, one antenna may be experiencing significant multi-path fading, while another antenna will be experiencing much less multi-path fading. Thus, the receiver selects the signals received via the antenna experiencing the least amount of multi-path fading.

While such use of diversity antennas reduces the adverse effects of multi-path fading, it does so by discarding the signals received via the other antenna, or antennas. In many instances, the multi-path fading does not significantly adversely affect all of the subcarriers of a channel, but only a few subcarriers. Thus, by discarding the entire signal, some useful information is being ignored, which, if used, could improve the receiver's ability to accurately recapture the transmitted data.

Therefore, a need exists for a method and apparatus of a radio receiver that includes a diversity antenna structure that improves the receiver's accuracy by using information from multiple antennas.

BRIEF SUMMARY OF THE INVENTION

The radio receiver having a diversity antenna structure of the present invention substantially meets these needs and others. In one embodiment, a radio receiver includes a first diversity antenna structure, a second diversity antenna structure, a first RF receiver section, a second RF receiver section, a combining module, and a baseband processing module. The first diversity antenna structure includes a plurality of first antennas and each of the plurality of first antennas is operably coupled to receive inbound radio frequency (RF) signals, wherein the first diversity antenna structure provides the received inbound RF signals from one of the plurality of first antennas based on a first antenna selection signal to produce first received inbound RF signals. The second diversity antenna structure includes a plurality of second antennas and each of the plurality of second antennas is operably coupled to receive the inbound RF signals, wherein the second diversity antenna structure provides the received inbound RF signals from one of the plurality of second antennas based on a second antenna selection signal to produce second received inbound RF signals. The first RF receiver section is operably coupled to convert the first received inbound RF signals into first inbound baseband signals. The second RF receiver section is operably coupled to convert the second received inbound RF signals into second inbound baseband signals. The combining module is operably coupled to combine the first and second inbound baseband signals to produce inbound baseband signals. The baseband processing module is operably coupled to convert the inbound baseband signals into inbound data and to produce the first and second antenna selection signals based on signal integrity of the first and second diversity antenna structures, respectively.

In another embodiment, a radio receiver includes a diversity antenna structure, a first RF receiver section, a second RF receiver section, a combining module, and a baseband processing module. The diversity antenna structure includes a plurality of antennas and each of the plurality of antennas is operably coupled to receive inbound radio frequency (RF) signals, wherein the diversity antenna structure selects first received inbound RF signals from one of the plurality of antennas based on a first antenna selection signal and selects second received inbound RF signals from another one of the plurality of antennas based on a second antenna selection signal. The first RF receiver section is operably coupled to convert the first received inbound RF signals into first inbound baseband signals. The second RF receiver section is operably coupled to convert the second received inbound RF signals into second inbound baseband signals. The combining module is operably coupled to combine the first and second inbound baseband signals to produce inbound baseband signals. The baseband processing module is operably coupled to convert the inbound baseband signals into inbound data and to produce the first and second antenna selection signals based on signal integrity of the first and second diversity antenna structures, respectively.

DETAILED DESCRIPTION OF THE INVENTION

Figure 1:
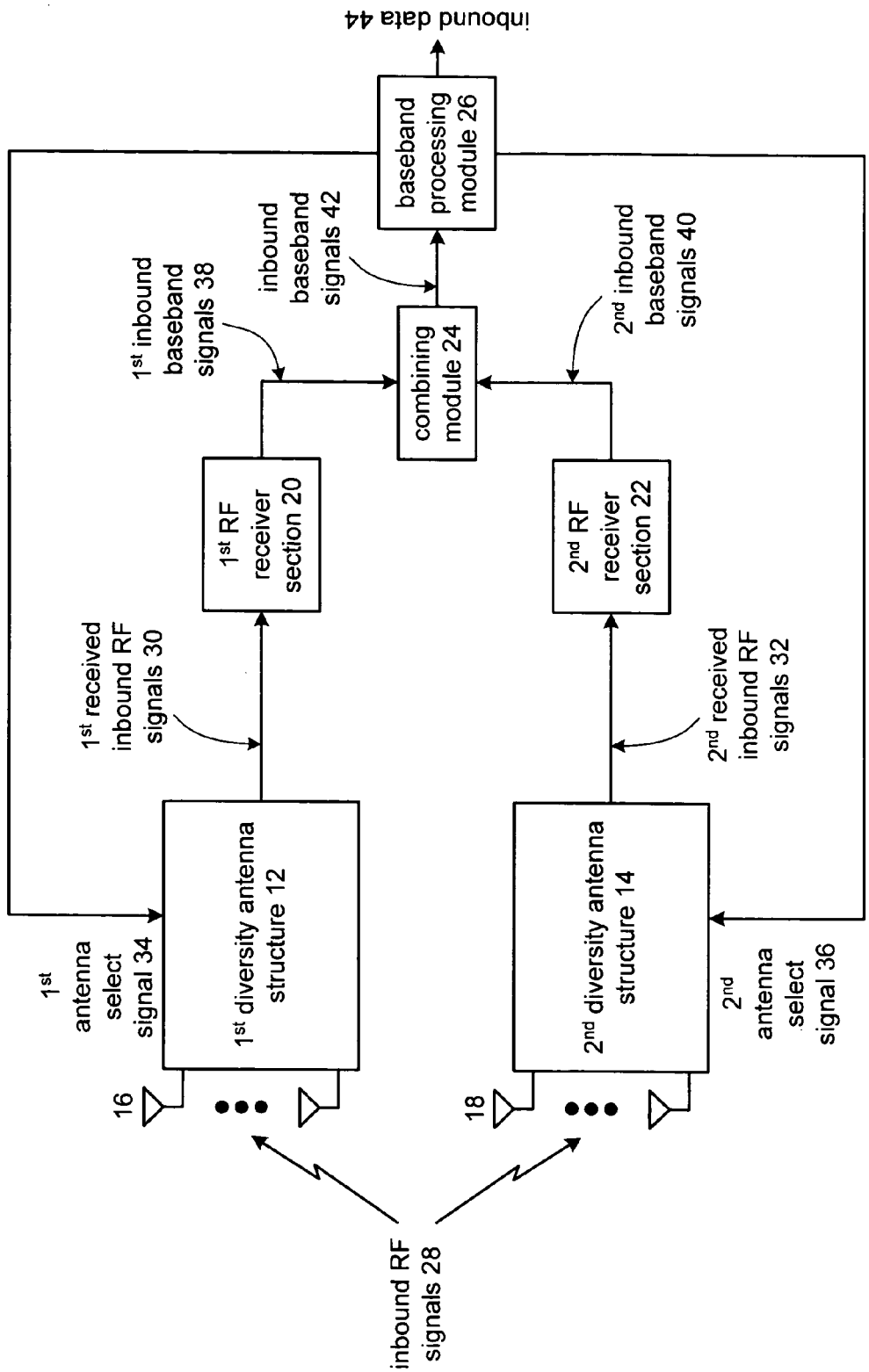
FIG. 1 is a schematic block diagram of a radio receiver in accordance with the present invention.

FIG. 1 is a schematic block diagram of a radio receiver 10 that includes a first diversity antenna structure 12, a second diversity antenna structure 14, a first radio frequency (RF) receiver section 20, a second RF receiver section 22, a combining module 24, and a baseband processing module 26. The first diversity antenna section 12 includes a plurality of antennas 16 and the second diversity antenna section 14 includes a plurality of antennas 18. Each of the plurality of antennas 16 and 18 includes at least two antennas that may be spatial diverse antennas and/or polar diverse antennas.

In operation, the receiver 10 receives inbound RF signals 28 via the plurality of antennas 16 and 18. In one embodiment, a transmitter transmits the RF signals 28 in accordance with one or more wireless communication standards (e.g., IEEE 802.11a) such that the wireless communication between the transmitter and the receiver 10 is generally referred to as a single input multiple output (SIMO) communication.

Figure 2:
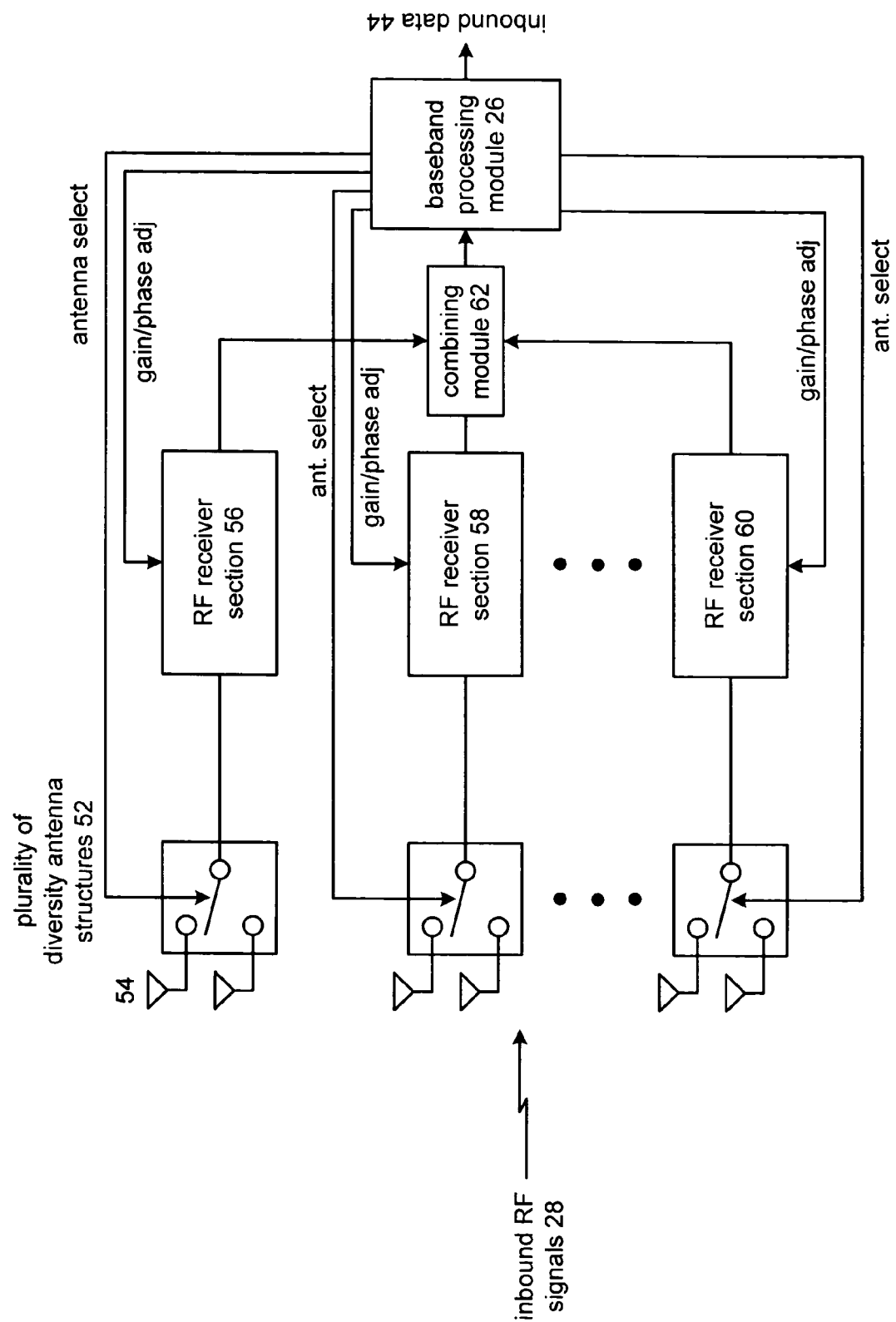
FIG. 2 is a schematic block diagram of another radio receiver in accordance with the present invention.

The first diversity antenna structure 12, which will be further described in an embodiment of FIG. 2, selects the inbound RF signals 28 received by one of the plurality of antennas 16 based on a first antenna selection signal 34 and provides the selected inbound RF signals to the first RF receiver section 20 as first received inbound RF signals 38. The first diversity antenna structure 12 receives the first antenna selection signal 34 from the baseband processing module 26, which generates the signal 34 by comparing the signal integrity (e.g., signal strength and/or signal quality) of the RF signals received by each of the antennas 16 and selecting the one with a desirable signal integrity.

The second diversity antenna structure 14, which will also be further described in the embodiment of FIG. 2, selects the inbound RF signals 28 received by one of the plurality of antennas 18 based on a second antenna selection signal 36 and provides the selected inbound RF signals 28 to the second RF receiver section 22 as second received inbound RF signals 40. The baseband processing module 26 generates the signal 36 by comparing the signal integrity (e.g., signal strength and/or signal quality) of the RF signals received by each of the antennas 18 and selecting the one with a desirable signal integrity.

The first and second RF receiver sections 20 and 22, which may be super-heterodyne receivers, or direct conversion, converts the received inbound RF signals 30 and 32 into baseband signals 38 and 40, respectively. The baseband signals 38 and 40 may be digital baseband signals or analog baseband signals. In one embodiment, the baseband processing module 26 further functions to adjust gain and/or phase of the first and second RF receiver sections based on the signal integrity of the first received inbound RF signals and the second received inbound RF signals, respectively. The baseband processing module 26 may adjust the gain and/or phase in the digital domain or the analog domain. In the digital domain, the baseband processing module 26 adjusts the gain and/or phase on a subcarrier by subcarrier basis prior to, or after, generating the antenna select signals. In the analog domain, the baseband processing module 26 adjusts the gain and/or phase at the channel level. The adjustment of the gain and/or phase of the receiver sections 20 and 22 may be performed as described in co-pending patent application entitled METHOD AND APPARATUS FOR SIGNAL DECODING IN A DIVERSITY RECEPTION SYSTEM WITH MAXIMUM RATIO COMBINING, a Ser. No. of 10/376,486 and a filing date of Feb. 28, 2003.

The combining module 24 combines (e.g., sums, performs a weighted sum, and/or performs phase shifting) the first and second inbound baseband signals 38 and 40 to produce inbound baseband signals 42. The baseband processing module 26 converts the inbound baseband signals 42 into inbound data 44 in accordance with one or more wireless communication standards (e.g., IEEE 802.11a). In one embodiment, the baseband processing module 26 may include a processing module and associated memory. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 26 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

FIG. 2 is a schematic block diagram of another radio receiver 50 that includes a plurality of diversity antenna structures 52, a plurality of RF receiver sections 56-60, a combining module 62, and the baseband processing module 26. Each of the plurality of diversity antenna structures includes a plurality of antennas 54 (two shown per structure) and an RF switch or RF multiplexer. In this embodiment, the RF switch is a single pole double throw switch to accommodate the two antennas, which may be spatial and/or polar diversity antennas. In other embodiments, the RF switch may be a multiple pole multiple throw switch.

In operation, each of the plurality of antennas of each antenna structure 52 receives the inbound RF signals 28 and provides them to a respective terminal of the corresponding RF switches. The RF switches are set based on the antenna selection signals provided by the baseband processing module 26, which generates the antenna selection signals as previously discussed.

The RF receiver sections 56-60, which may be super-heterodyne receivers, or direct conversion, converts the respective inbound RF signals into inbound baseband signals. Note that the baseband processing module 26 may adjust the gain and/or phase of each of the RF receiver sections 56-60 prior to, or following, the conversion of the RF signals into baseband signals.

The combining module 62 combines (e.g., sums, performs a weighted sum, and/or performs phase shifting) the inbound baseband signals of the RF receiver sections 56-60 to produce inbound baseband signals. The baseband processing module 26 converts the inbound baseband signals into inbound data 44 in accordance with one or more wireless communication standards.

Figure 3:
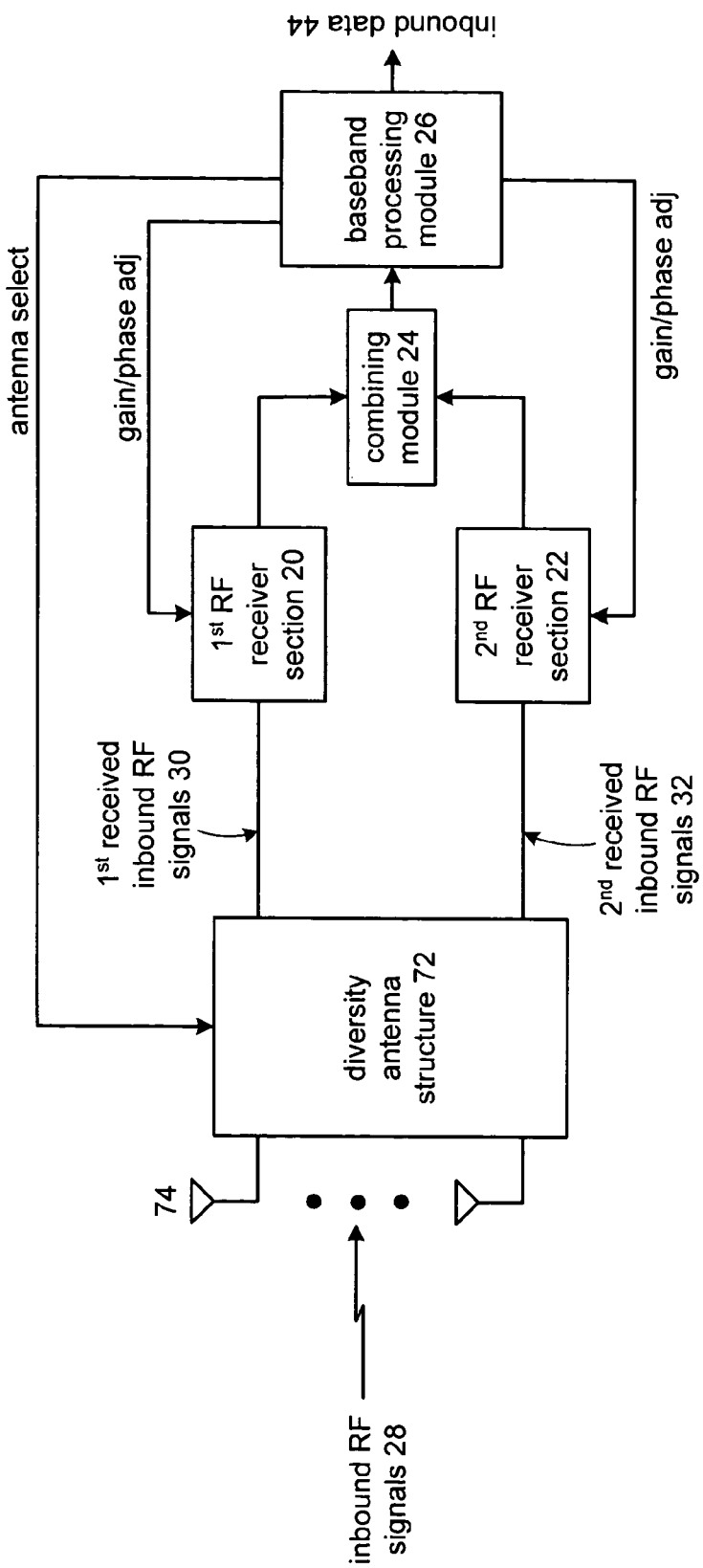
FIG. 3 is a schematic block diagram of yet another radio receiver in accordance with the present invention.

FIG. 3 is a schematic block diagram of a radio receiver 70 that includes a diversity antenna structure 72, the first and second RF receiver sections 20 and 22, the combining module 24, and the baseband processing module 26. The diversity antenna structure 72, which will be described in greater detail with reference to FIGS. 4 and 5, includes a plurality of antennas 74, which may be spatial and/or polar diversity antennas.

In operation, the plurality of antennas 74 receives the inbound RF signals 28 and, based on an antenna selection signal from the baseband processing module 26, the diversity antenna structure 72 outputs two inbound RF signals 30 and 32. The first and second RF receiver sections 20 and 22, the combining module 24, and the baseband processing module 26 function as previously described with reference to FIG. 1 to produce the inbound data 44.

Figures 4, 5:
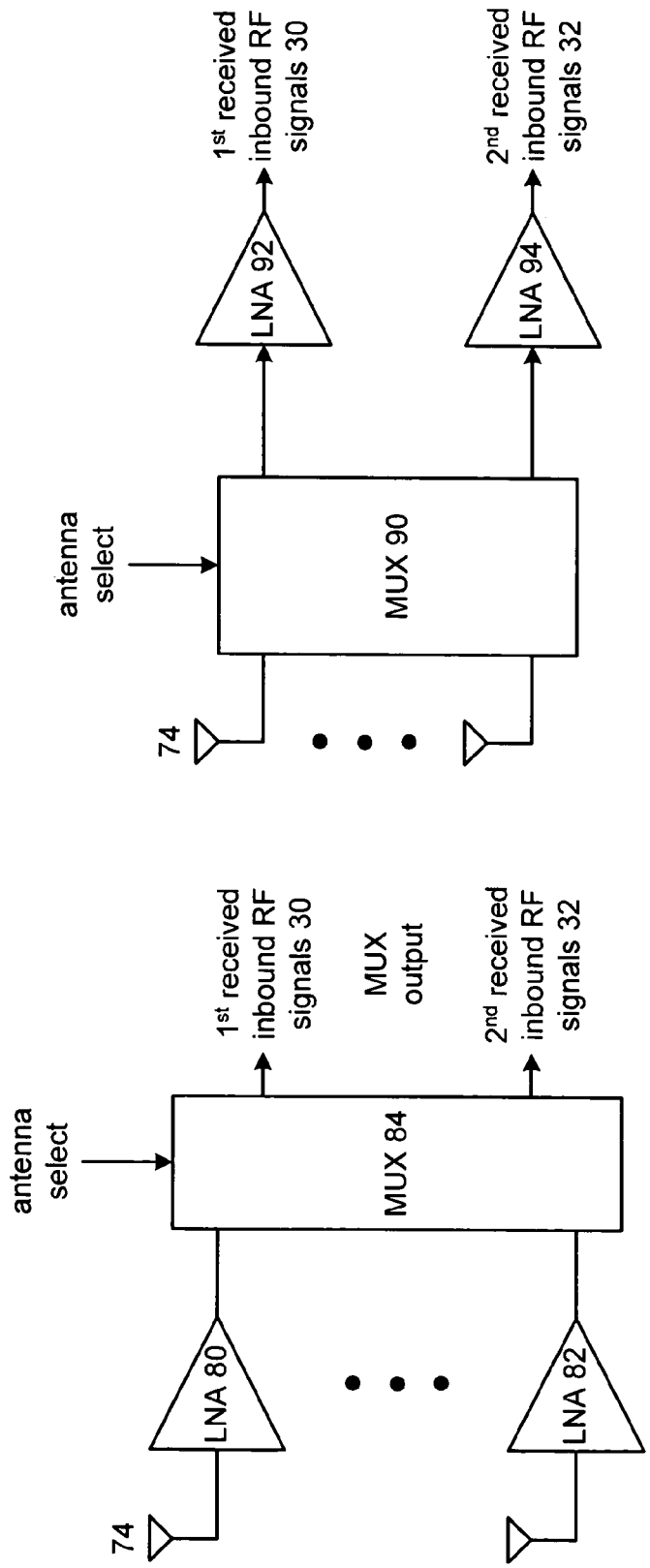
FIG. 4 is a schematic block diagram of a diversity antenna structure in accordance with the present invention.
FIG. 5 is a schematic block diagram of another diversity antenna structure in accordance with the present invention.

FIG. 4 is a schematic block diagram of an embodiment of diversity antenna structure 72 that includes the plurality of antennas 74, a plurality of low noise amplifiers (LNA) 80-82 and a multiplexer 84. The plurality of antennas 74, which includes at least three, receives the inbound RF signals 28 and provides them to the corresponding LNA 80-82. The LNAs amplify the inbound RF signals and provide the amplified RF signals to the input of the multiplexer 84.

The multiplexer 84, based on the antenna select signal from the baseband processing module 26, outputs the first and second inbound RF signals 30 and 32. Note that the multiplexer 84 may be an N-input 2-output multiplexer or may be two N/2-input single output multiplexers.

FIG. 5 is a schematic block diagram of another embodiment of diversity antenna structure 72 that includes the plurality of antennas 74, a multiplexer 90, and two LNAs 92 and 94. In this embodiment, the multiplexer 90 is coupled to the antennas 74 and outputs two of the received RF signals of the antennas 74 based on the antenna select signal from the baseband processing module 26. The LNAs 92 and 94 amplify the respective RF signals to produce the first and second inbound RF signals 30 and 32. Note that the multiplexer 90 may be an N-input 2-output multiplexer or may be two N/2-input single output multiplexers. As one of ordinary skill in the art will appreciate, the multiplexers 84 and 90 may include more than two outputs to accommodate different receiver embodiments.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a radio receiver having a diversity antenna structure that improves the receiver's performance. As one of ordinary skill in the art will appreciate, other embodiments may be derived from the teachings of the present invention without deviating from the scope of the claims.

What is claimed is:

1. A radio receiver comprises:
   a first diversity antenna structure having a plurality of first antennas, wherein each of the plurality of first antennas is operably coupled to receive inbound radio frequency (RF) signals;
   a multiplexer attached to the first diversity antenna, wherein the multiplexer selects received inbound RF signals from one of the plurality of first antennas of the first diversity antenna structure based on a first antenna selection signal to produce first received inbound RF signals and wherein the multiplexer selects received inbound RF signals from a second one of the plurality of first antennas of the first diversity antenna structure based on a second antenna selection signal to produce second received inbound RF signals;
   a first RF receiver section operably coupled to convert the first received inbound RF signals into first inbound baseband signals;
   a second RF receiver section operably coupled to convert the second received inbound RF signals into second inbound baseband signals;
   a combining module operably coupled to combine the first and second inbound baseband signals to produce inbound baseband signals; and
   a baseband processing module operably coupled to:
      adjust at least one of gain and phase in a digital domain on a subcarrier by subcarrier basis of at least one of the first RF receiver section and the second RF receiver section based on signal integrity of at least one of the first received inbound RF signals and the second received inbound RF signals; and
      produce the first and second antenna selection signals based on signal integrity of the plurality of first antennas of the first diversity antenna structure.

2. The radio receiver of claim 1, wherein the baseband processing module functions to:
   convert the inbound signals into inbound data.

3. The radio receiver of claim 2, wherein the baseband processing module further functions to:
   adjust the at least one of the gain and phase in the digital domain on the subcarrier by subcarrier basis prior to generating the antenna select signals or after generating the antenna select signals.

4. The radio receiver of claim 2, wherein the baseband processing module further functions to:
   adjust the at least one of the gain or phase in an analog domain at a channel level.

5. The radio receiver of claim 1, wherein each of the plurality of first antennas comprises at least one of:
   a spatial diverse antenna; and
   a polar diverse antenna.

6. The radio receiver of claim 1 further comprises:
   a second diversity antenna structure having a plurality of second antennas, wherein each of the plurality of second antennas is operably coupled to receive the inbound RF signals, wherein the second diversity antenna structure provides the received inbound RF signals from one of the plurality of second antennas based on a third antenna selection signal to produce third received inbound RF signals;
   a third RF receiver section operably coupled to convert the third received inbound RF signals into third inbound baseband signals;
   the combining module operably coupled to combine the first, second, and third inbound baseband signals to produce the inbound baseband signals; and the baseband processing module operably coupled to produce the third antenna selection signal based on the signal integrity of the second diversity antenna structure.

7. A radio receiver comprises:

a diversity antenna structure having a plurality of antennas, wherein each of the plurality of antennas is operably coupled to receive inbound radio frequency (RF) signals, wherein the diversity antenna structure includes a single antenna select input and receives antenna selection signals on the single antenna select input and wherein the diversity antenna structure selects first received inbound RF signals from one of the plurality of antennas based on a first antenna selection signal from the single antenna select input and selects second received inbound RF signals from another one of the plurality of antennas based on a second antenna selection signal from the single antenna select input, wherein the diversity antenna structure comprises:
  a multiplexer that includes N inputs and M outputs, wherein N and M are positive integers and wherein the N inputs of the multiplexer are operably coupled to the plurality of antennas and a control input is operably coupled to receive the first and second antenna selection signals; and
  a plurality of low noise amplifiers operably coupled to the M outputs of the multiplexer, wherein the plurality of low noise amplifiers provide the first and second received inbound RF signals;

a first RF receiver section operably coupled to convert the first received inbound RF signals into first inbound baseband signals;

a second RF receiver section operably coupled to convert the second received inbound RF signals into second inbound baseband signals;

a combining module operably coupled to combine the first and second inbound baseband signals to produce inbound baseband signals; and a baseband processing module operably coupled to convert the inbound baseband signals into inbound data and to produce the first and second antenna selection signals based on signal integrity of the diversity antenna structure.

8. A radio receiver comprises:

a diversity antenna structure having a plurality of antennas, wherein each of the plurality of antennas is operably coupled to receive inbound radio frequency (RF) signals, wherein the diversity antenna structure includes a single antenna select input and receives antenna selection signals on the single antenna select input and wherein the diversity antenna structure selects first received inbound RF signals from one of the plurality of antennas based on a first antenna selection signal from the single antenna select input and selects second received inbound RF signals from another one of the plurality of antennas based on a second antenna selection signal from the single antenna select input, wherein the diversity antenna structure comprises:
  a plurality of low noise amplifiers operably coupled to the plurality of antennas; and
  a multiplexer that includes M outputs and N inputs, wherein M and N are positive integers and wherein the N inputs of the multiplexer are operably coupled to outputs of the plurality of low noise amplifiers, and a control input is operably coupled to receive the first and second antenna selection signals, wherein the M outputs of the multiplexer provide the first and second received inbound RF signals;

a first RF receiver section operably coupled to convert the first received inbound RF signals into first inbound baseband signals;

a second RF receiver section operably coupled to convert the second received inbound RF signals into second inbound baseband signals;

a combining module operably coupled to combine the first and second inbound baseband signals to produce inbound baseband signals; and a baseband processing module operably coupled to convert the inbound baseband signals into inbound data and to produce the first and second antenna selection signals based on signal integrity of the diversity antenna structure.

9. A radio receiver comprises:

a diversity antenna structure having a plurality of antennas, wherein each of the plurality of antennas is operably coupled to receive inbound radio frequency (RF) signals, wherein the diversity antenna structure includes a single antenna select input and receives antenna selection signals on the single antenna select input and wherein the diversity antenna structure selects first received inbound RF signals from one of the plurality of antennas based on a first antenna selection signal from the single antenna select input and selects second received inbound RF signals from another one of the plurality of antennas based on a second antenna selection signal from the single antenna select input;

a first RF receiver section operably coupled to convert the first received inbound RF signals into first inbound baseband signals;

a second RF receiver section operably coupled to convert the second received inbound RF signals into second inbound baseband signals; and a combining module operably coupled to combine the first and second inbound baseband signals to produce inbound baseband signals; and a baseband processing module operably coupled to convert the inbound baseband signals into inbound data and to produce the first and second antenna selection signals based on signal integrity of the diversity antenna structure, wherein the baseband processing module functions to:
  adjust at least one of gain and phase in a digital domain on a sub carrier by subcarrier basis of at least one of the first and second RF receiver sections based on signal integrity of at least one of the first received inbound RF signals and the second received inbound RF signals prior to generating the antenna select signals or after generating the antenna select signals.

10. The radio receiver of claim 9, wherein the baseband processing module further functions to:
  adjust the at least one of the gain or phase in an analog domain at a channel level.

11. The radio receiver of claim 9, wherein each of the plurality of antennas comprises at least one of:
  a spatial diverse antenna; and
  a polar diverse antenna.

12. A radio receiver comprises:

a diversity antenna structure having a plurality of antennas, wherein each of the plurality of antennas is operably coupled to receive inbound radio frequency (RF) signals, wherein the diversity antenna structure selects a first received inbound RF signals from one of the plurality of antennas and selects a second received inbound RF signals from another one of the plurality of antennas based on an antenna selection signal;

a first RF receiver section operably coupled to convert the first received inbound RF signals into first inbound baseband signals;

a second RF receiver section operably coupled to convert the second received inbound RF signals into second inbound baseband signals;

a combining module operably coupled to combine the first and second inbound baseband signals to produce inbound baseband signals; and a baseband processing module operably coupled to adjust a gain and phase in a digital domain on a subcarrier by subcarrier basis of the first and second RF receiver sections based on signal integrity of the first received inbound RF signals and the second received inbound RF signals and to convert the inbound baseband signals into inbound data, wherein the baseband processing module is operably coupled to produce the antenna selection signal based on signal integrity of inbound RF signals from each of the plurality of antennas.

13. The radio receiver of claim 12, wherein the baseband processing module further functions to:

adjust the gain and phase in a digital domain on a sub carrier by subcarrier basis of the first and second RF receiver sections prior to generating the antenna selection signal.

14. The radio receiver of claim 12, wherein the baseband processing module further functions to:

adjust the gain and phase in a digital domain on a sub carrier by subcarrier basis of the first and second RF receiver sections after generating the antenna selection signal.

15. The radio receiver of claim 12, wherein the plurality of antennas comprises a spatial diverse antenna.

16. The radio receiver of claim 12, wherein the plurality of antennas comprises a polar diverse antenna.

17. The radio receiver of claim 12, wherein the diversity antenna structure comprises:

a multiplexer that includes M outputs, wherein N inputs of the multiplexer are operably coupled to the plurality of antennas and a control input is operably coupled to receive the antenna selection signal; and a plurality of low noise amplifiers operably coupled to the M outputs of the multiplexer, wherein the plurality of low noise amplifiers provide the first and second received inbound RF signals.

18. The radio receiver of claim 12, wherein the diversity antenna structure comprises:

a plurality of low noise amplifiers operably coupled to the plurality of antennas; and a multiplexer that includes M outputs, wherein N inputs of the multiplexer are operably coupled to outputs of the plurality of low noise amplifiers, and a control input is operably coupled to receive the antenna selection signal, wherein the M outputs of the multiplexer provide the first and second received inbound RF signals.

* * * * *